US009377971B2

(12) United States Patent
Poirier

(10) Patent No.: US 9,377,971 B2
(45) Date of Patent: Jun. 28, 2016

(54) SYSTEMS AND METHODS FOR IMPROVING DEVICE DISCOVERY

(71) Applicant: CANON KABUSHIKI KAISHA, Tokyo (JP)

(72) Inventor: Peter Poirier, Woodinville, WA (US)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 14/254,814

(22) Filed: Apr. 16, 2014

(65) Prior Publication Data

US 2015/0301766 A1 Oct. 22, 2015

(51) Int. Cl.
*G06F 3/12* (2006.01)
(52) U.S. Cl.
CPC ............ *G06F 3/1204* (2013.01); *G06F 3/1226* (2013.01); *G06F 3/1236* (2013.01); *G06F 3/1292* (2013.01)
(58) Field of Classification Search
None
See application file for complete search history.

(56) References Cited

U.S. PATENT DOCUMENTS

| 6,943,905 | B2* | 9/2005 | Ferlitsch | 358/1.13 |
|---|---|---|---|---|
| 7,099,937 | B1* | 8/2006 | Ochiai et al. | 709/224 |
| 7,536,695 | B2* | 5/2009 | Alam et al. | 719/313 |
| 8,145,265 | B2* | 3/2012 | Pawlecki et al. | 455/554.2 |
| 8,346,916 | B2* | 1/2013 | Hayashi et al. | 709/224 |
| 8,515,984 | B2* | 8/2013 | Gebhard et al. | 707/767 |
| 8,687,214 | B2* | 4/2014 | Kurahashi | 358/1.14 |
| 8,879,096 | B2* | 11/2014 | Honma | 358/1.15 |
| 2011/0051174 | A1* | 3/2011 | Hattori | 358/1.15 |
| 2012/0212759 | A1* | 8/2012 | Murata | 358/1.13 |

* cited by examiner

Primary Examiner — Paul F Payer
(74) Attorney, Agent, or Firm — Canon U.S.A., Inc. IP Division

(57) ABSTRACT

Systems and methods for a method for device discovery performed by a computer device are disclosed, including discovering networked devices and listing the network devices in a first list, enumerating installed devices from system software, listing the enumerated devices in a second list, and merging the lists of discovered and enumerated devices.

12 Claims, 20 Drawing Sheets

SYSTEMS AND METHODS FOR IMPROVING DEVICE DISCOVERY

BACKGROUND

1. Field

The present disclosure relates to systems and methods for improving device discovery.

2. Background

The release of mobile and table-optimized operating systems (OSs) has increased the availability and popularity of applications ("apps"). Unlike traditional personal computer (PC, such as Windows® or Mac®-based) operating systems and programs, they are characterized by a pared down, streamlined user interface (UI) that responds to touch gestures. However the new app environment introduces additional limitations that must be overcome to give users an enjoyable experience.

For example, Microsoft® provides a print subsystem for its Windows® Store apps similar to what was offered for earlier legacy apps. However, due to new restrictions it is not possible to access all device functionality using the new subsystem. Furthermore, in some iterations or releases, there is no support for scanning. Thus there is a need for development of print and/or scan applications that bypass the conventional print path and implement their own scan functionality without relying on drivers or any print subsystem components. Since these apps are not using, for example, the Windows 8 ("Win8") print subsystem it is not necessary for users to first install the printer to the Windows Devices & Printers folder. Instead, the app will discover the network-connected device and use it directly.

SUMMARY

In one embodiment, a method for device discovery performed by a computer device includes discovering networked devices and listing the network devices in a first list, enumerating installed devices from system software, listing the enumerated devices in a second list, and merging the lists of discovered and enumerated devices.

In another embodiment, a system for determining discoverable devices includes a computer readable storage device, a processor, and a discovery unit configured to discover networked devices and list the network devices in a first list, enumerate installed devices and list the enumerated devices in a second list, and merge the lists into a comprehensive discoverable device list.

In a further embodiment, a method of discovering accessible devices on a computer network includes, on a first subnet of the network, performing discovery comprising broadcasting a notification message to all devices on the client computer's subnet, listening for responses to write a network discovered device list. On a different subnet of the network, enumerating installed devices by, if a remote device has already been installed to the local system, obtaining communication information from the system's internal device tree, and augmenting the network-discovered device list with the enumerated information.

Another method for obtaining a list of discovered network devices includes performing network discovery to obtain a list of discovered network devices, performing enumerated discovery to obtain a list of installed devices, and for each device discovered thereby, checking the device against the list of discovered network devices. In a case where the device is not found in the list, the device is added to the list of discovered network devices, and in a case where the device is found in the list, the device is considered re-discovered and not again added to the list of discovered network devices.

In yet another embodiment, a method for device discovery performed by a computer device, the method includes discovering networked devices and listing the network devices in a first list, enumerating installed devices from system software, listing the enumerated devices in a second list, and merging the lists of discovered and enumerated devices. Device discovery is performed by Web Services for Devices (WSD) discovery to yield a first list, by a proprietary discovery protocol to yield a second list, and system device enumeration yields a third list. IP addresses are determined from service addresses associated with the first list, duplicates between the first and second list are removed from the second list using IP address as an identifier key, resulting in a modified second list. Duplicates between the first and third list are removed from the first list using serial number as an identifier key, resulting in a modified first list. Duplicates between the modified second list and third list are removed from the modified second list using IP address as an identifier key, resulting in a twice-modified second list, and the twice-modified second list, modified first list and third list are combined to yield a merged all-inclusive device list.

This brief summary has been provided so that the nature of this disclosure may be understood quickly. A more complete understanding can be obtained by reference to the following detailed description and to the attached drawings.

DETAILED DESCRIPTION

The following disclosure describes certain explanatory embodiments. Other embodiments may include alternatives, equivalents, and modifications. Additionally, the explanatory embodiments may include several novel features, and a particular feature may not be essential to practice the systems and methods described herein. Although the discussed examples correspond to real scenario(s), in the interest of security, the specific IP addresses have been masked. Despite the use of masked IP addresses, the intent is to demonstrate that same or differing models of devices located at various physical and IP address locations can be differentiated while discussing the discovery-related subject matter herein.

Figure 1:
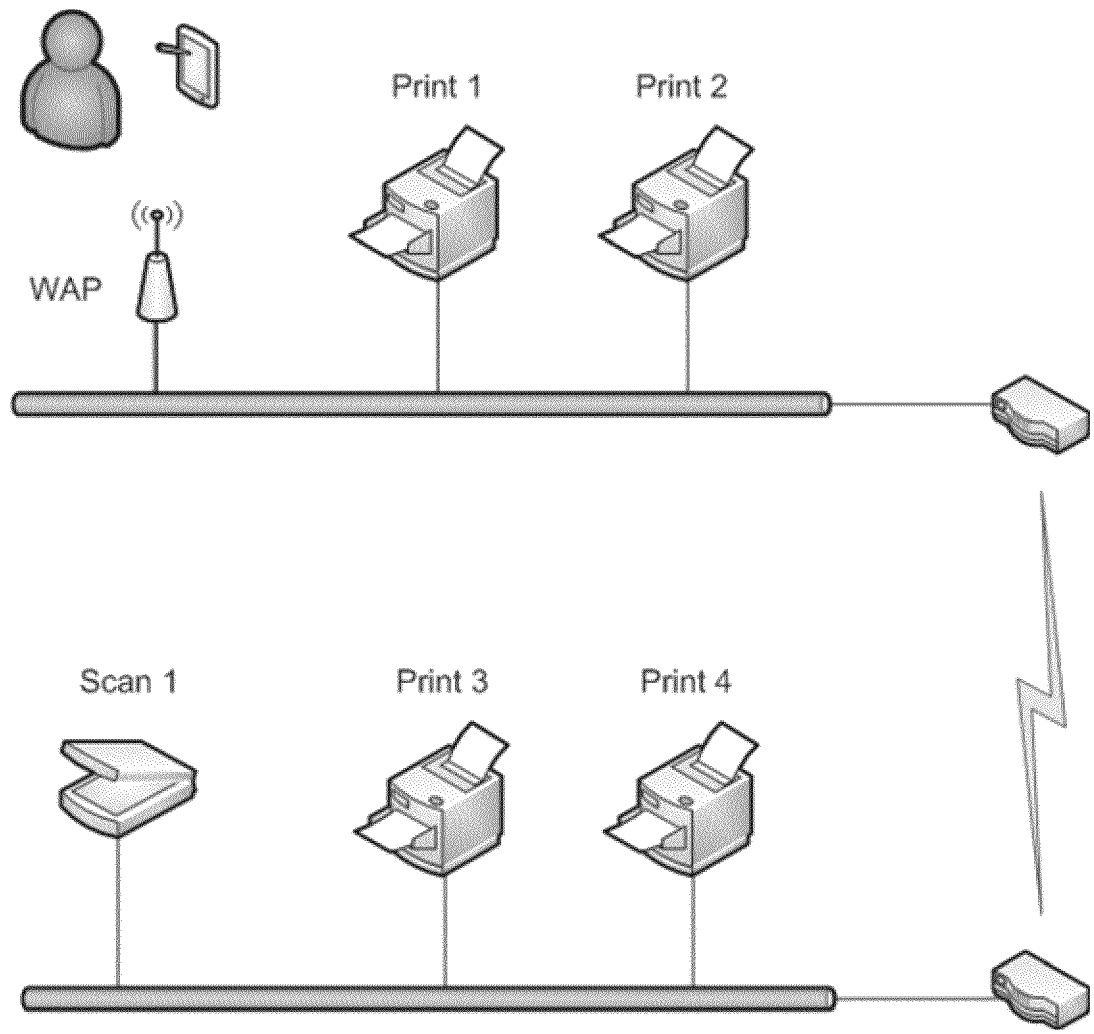
FIG. 1 is an example device discovery scenario.

Discovery typically entails broadcasting a notification message to all devices on the client computer's subnet, then listening for responses. However if the device is on a different subnet than the client computer, such as at a remote office location, then the device will not respond to the notification message and hence will be unreachable by the print/scan app. This scenario is shown in FIG. 1. The tablet user connects through a wireless access point (WAP) and runs the print application which broadcasts a discovery message to all the devices on the local network, in this case "Print 1" and "Print 2". There are additional devices in a remote office, "Scan 1", "Print 3", and "Print 4", which the user can access through a Virtual Private Network (VPN); however they are not discoverable since they are on a different subnet of the corporate network. Thus, the print/scan application will only list "Print 1" and "Print 2" as the available devices.

Figure 2:
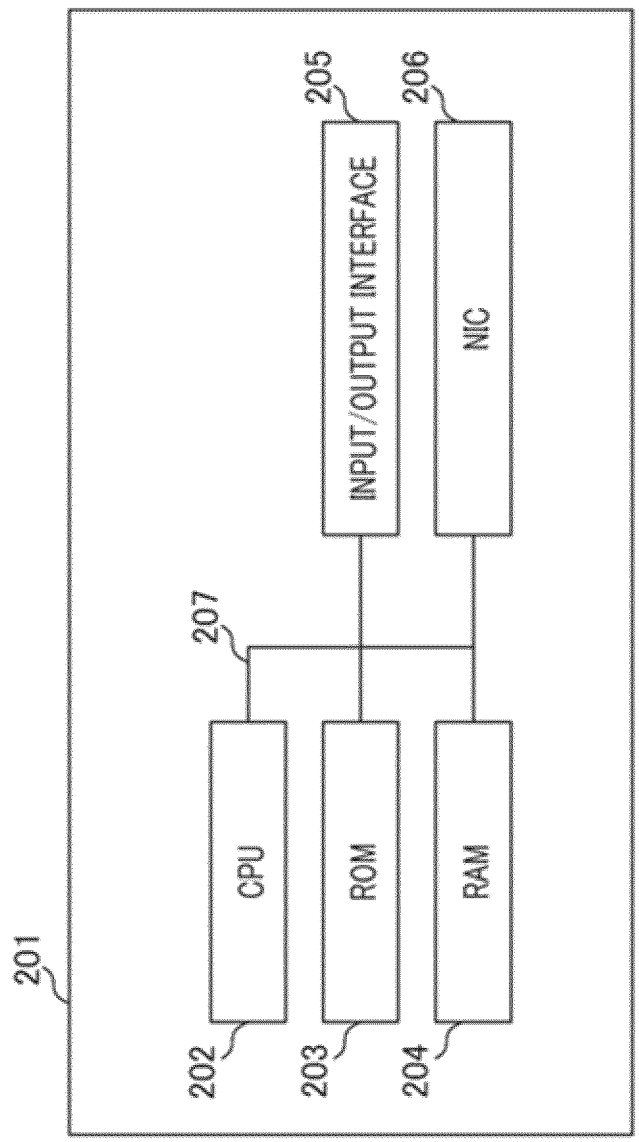
FIG. 2 is an example hardware module block diagram.

FIG. 2 is a block diagram illustrating an example embodiment of a device discovery system hardware configuration. The hardware may be embodied on a Tablet A or other computers. A CPU (Central Processing Unit) 202 is a unit that executes various programs and realizes various functions.

A ROM (Read Only Memory) 203 is a unit that stores various programs. A RAM (Random Access Memory) 204 is a storage unit that functions as a temporal working storage region for the CPU 202. The CPU 202 loads a program stored in the ROM 203 into the RAM 204 to thereby execute a program. An Input/Output interface 205 transmits data to a display (not shown) connected to each device and each server group. ROM 203 or RAM 204 may store software programs and other data described in FIG. 15 or FIG. 16. The software modules may perform the processes described in FIG. 17 through FIG. 19. The lists described in FIG. 17 through FIG. 19 may be stored in, for example, ROM 203 or in RAM 204.

Also, the Input/Output interface 205 receives data from a pointing device or a touch panel. An NIC (Network Interface Card) 206 connects the devices constituting a print system to a network. The units can receive/transmit data via a bus 207.

Also, an image forming device includes a print unit (not shown). The print unit can receive/transmit data from/to the units via the bus 207. The print unit is a unit that can print a raster image on a recording medium.

FIG. 3 is a block diagram that illustrates an example embodiment of software for providing device discovery capability to a user via an application.

Figure 4:
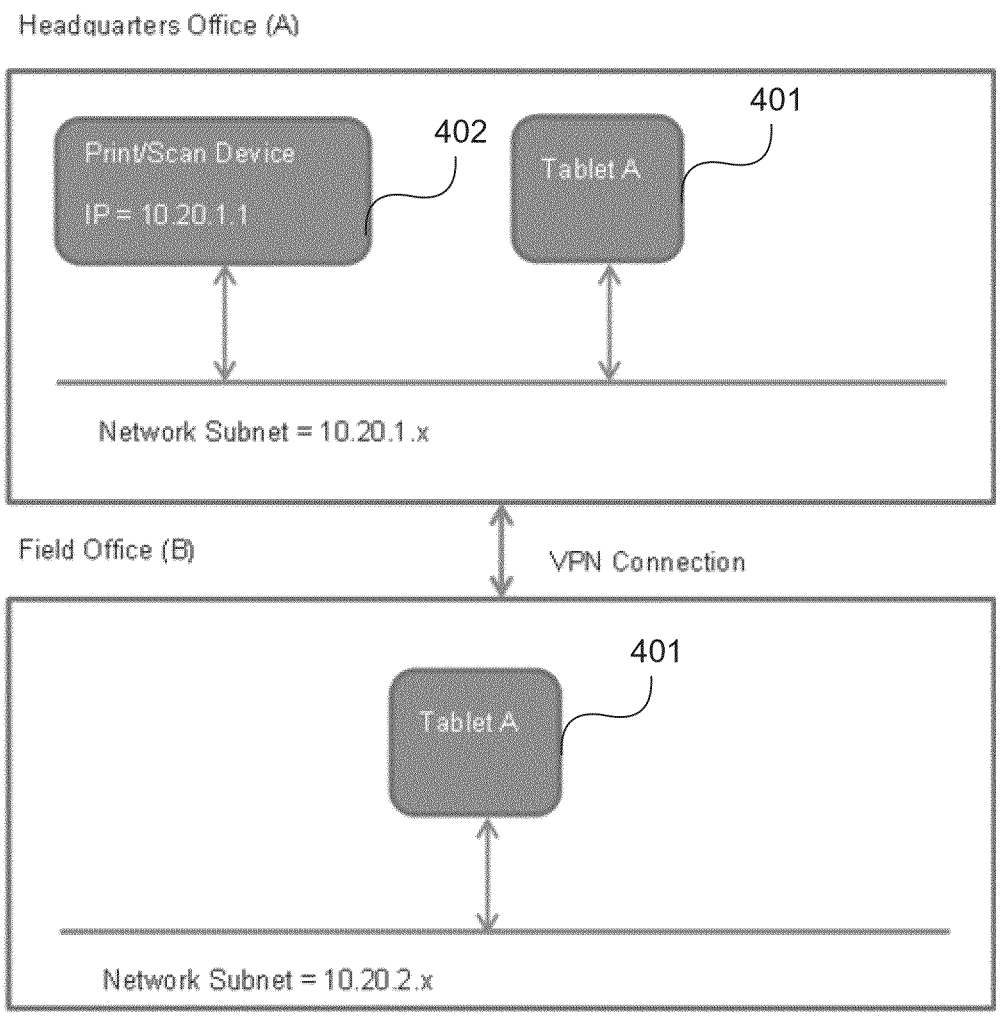
FIG. 4 is an example operational overview.

FIG. 4 is an operational overview of a scenario in which the instant subject matter may be especially useful.

In this scenario, Tablet A 401 is used with a local print/scan device 402, found at the IP address 10.20.1.1. The user has installed the device to the Devices and Printers folder while at the Headquarters Office (A). Tablet A 401 then travels to Field Office (B) and attempts to use the print/scan app with the print/scan device 402 at Headquarters (A). In a traditional implementation that is not possible unless the user manually types in the IP address of print/scan device 402 because now Tablet A 401 is on a different subnet (10.20.2.x). However, by employing the subject matter of the present application, the user can "discover" the print/scan device 402 despite being on a different subnet by searching the installed devices on Tablet A 401 and use that information to communicate with the desired device (here print/scan device 402).

Figure 5:
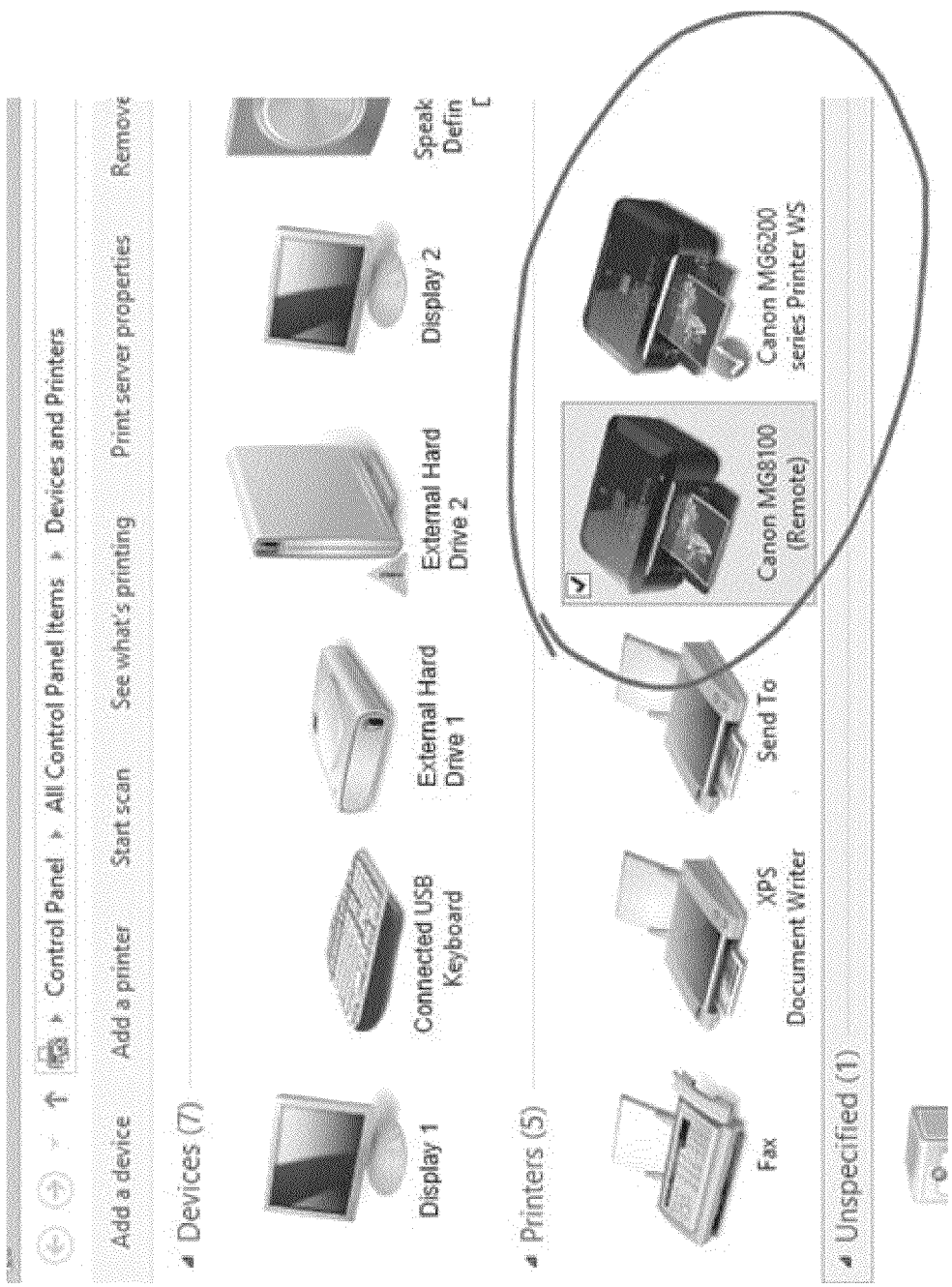
FIG. 5 is an example display of printers visible to a user.

In a first sample discovery scenario, consider a network environment where three printers are available, as shown in Table 1. However, the user likely only has visibility to a limited number of devices. This is shown in FIG. 5, where the Devices & Printers folder of the Control Panel only provides visibility to two printers, named "Canon MG8100 (Remote)" and "Canon MG6200 series Printer WS". The MG8100 model appears because it has already been installed on the user's computer, even though it is currently at a remote location and another device of the same manufacturer model is not visible even though it is on the user's current local network.

Figure 6B:
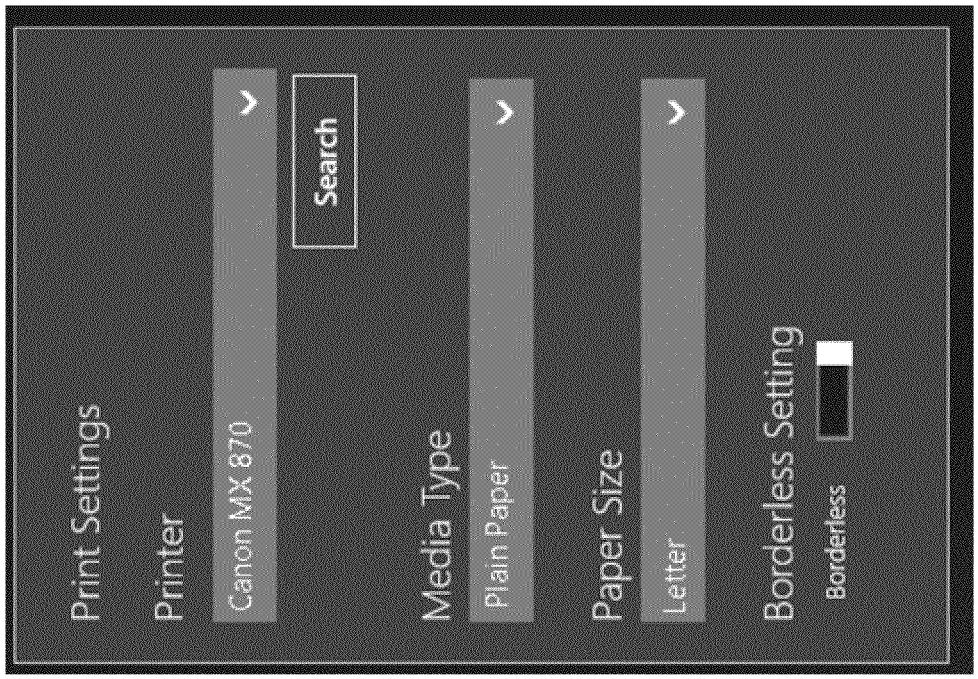
FIGS. 6A-6C show an example capture of printers accessible to a user running an example discovery application.
Figure 6A:
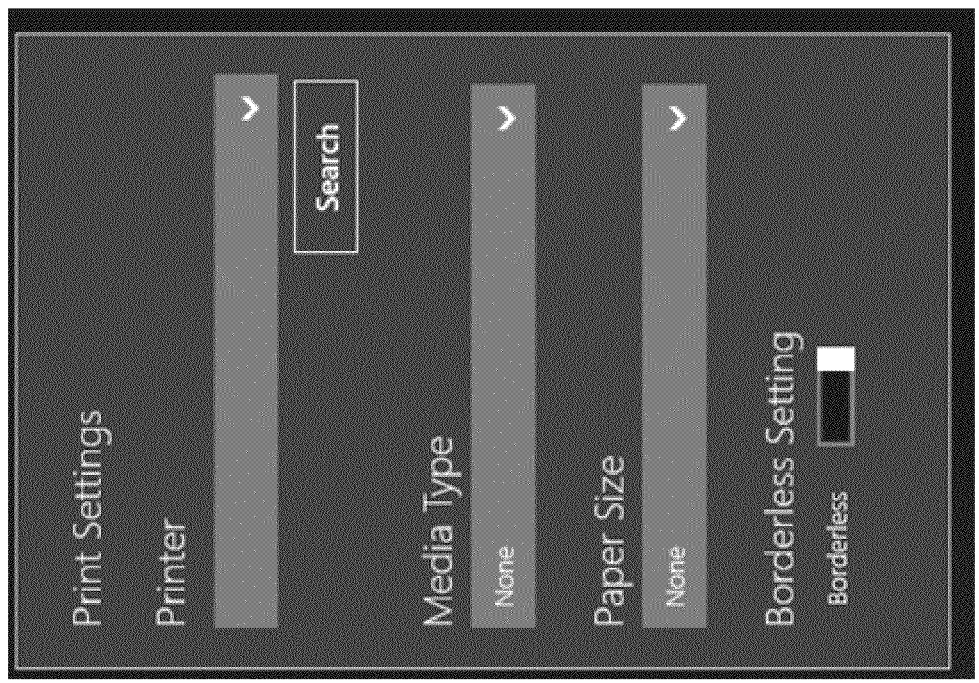
Figure 6C:
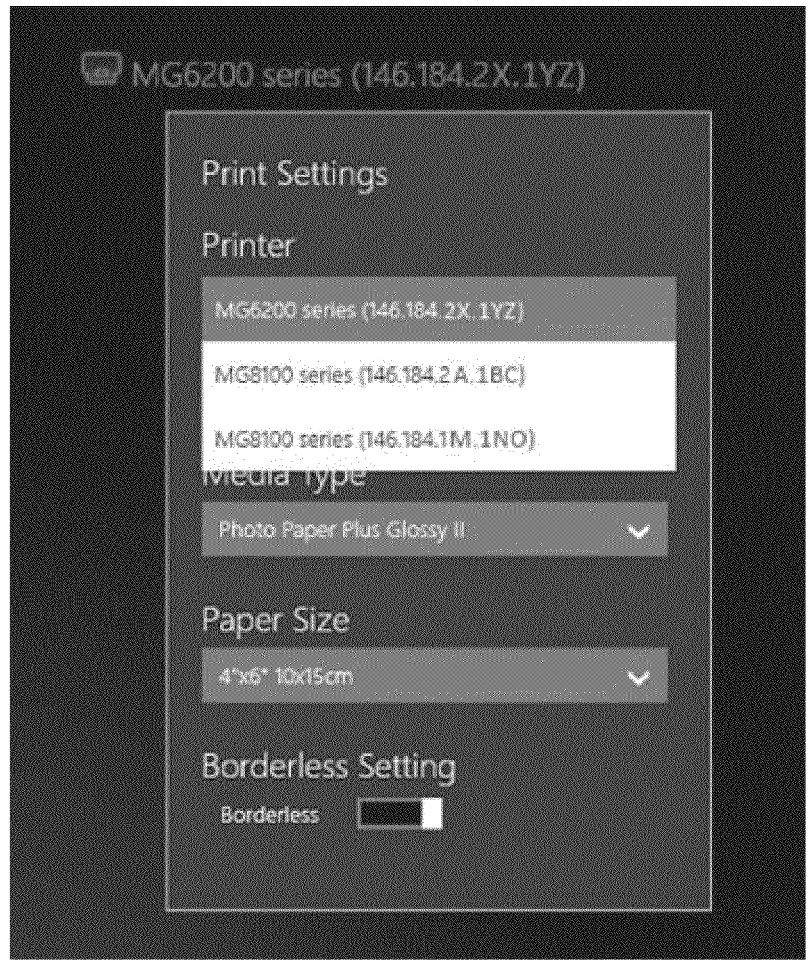

Thus, when the photo printing or other application having the functions disclosed herein is run, it performs discovery and discovers all available devices listed in Table 1. The resulting list, of all devices available for the user to perform operations with, is displayed in a graphical user interface format such as shown in FIG. 6C. This is significantly expanded from a graphical user interface display of physically connected printer devices as shown in FIG. 6A and FIG. 6B. After discovery, three printers may be seen by the user in the system, with their specific identifying information and discovery details summarized in Table 2. In such a manner the user is able to perform operations with devices it otherwise would not have known it had access to.

TABLE 1

| Model | IP Address | Installed |
| --- | --- | --- |
| MG 6200 | 146.184.2X.1YZ (local) | No |
| MG 8100 | 146.184.2A.1BC (local) | No |
| MG 8100 | 146.184.1M.1NO (remote) | Yes |

TABLE 2

| Model | IP Address | Discovery Details |
| --- | --- | --- |
| MG 6200 | 146.184.2X.1YZ (local) | Broadcast + enumeration + duplicate detection |
| MG 8100 | 146.184.2A.1BC (local) | Broadcast |
| MG 8100 | 146.184.1M.1NO (remote) | System enumeration |

Figure 7:
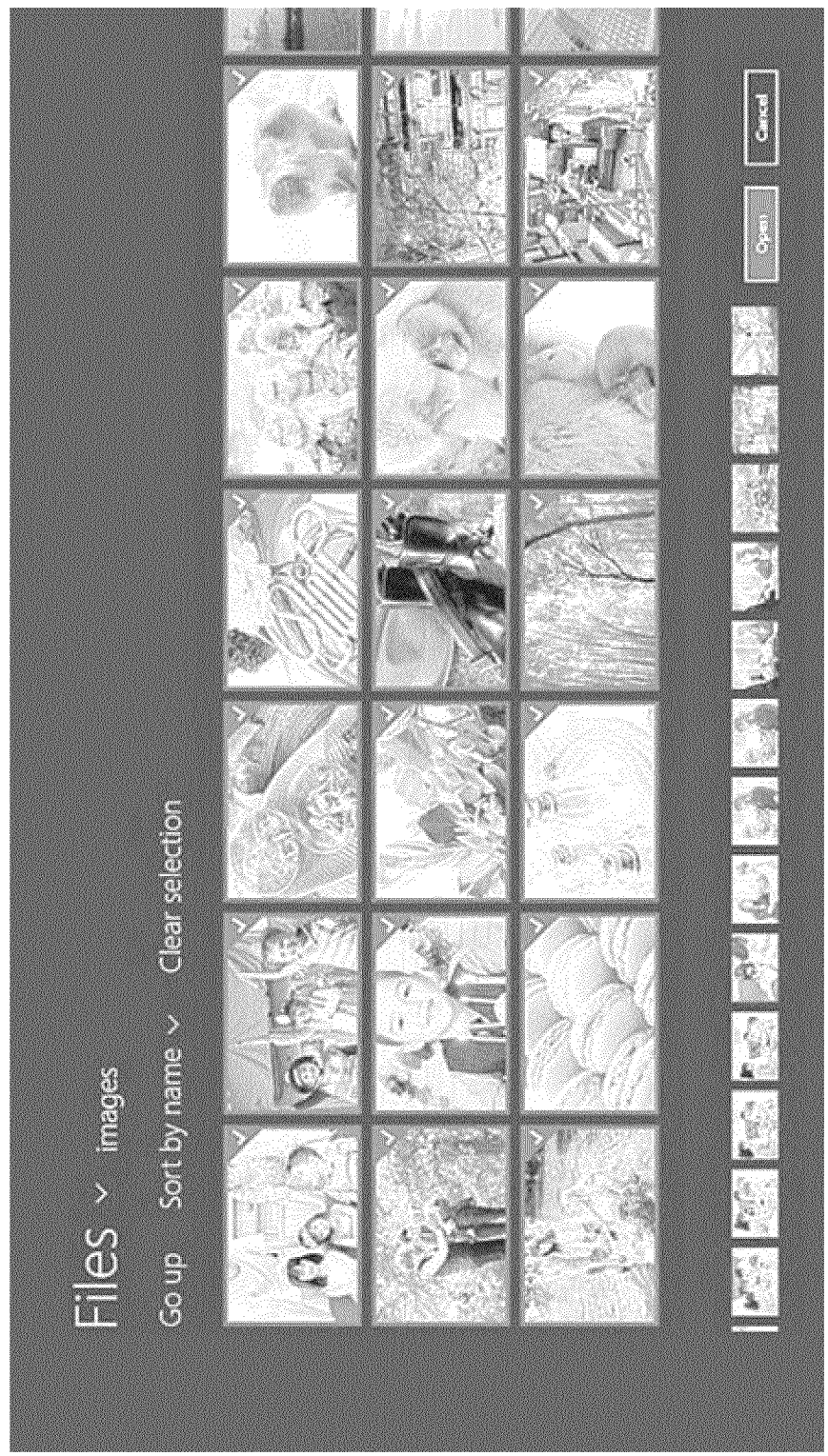
FIGS. 7-11 show an example of printing stored images using an example application as described herein.
Figure 8:
Figure 9:
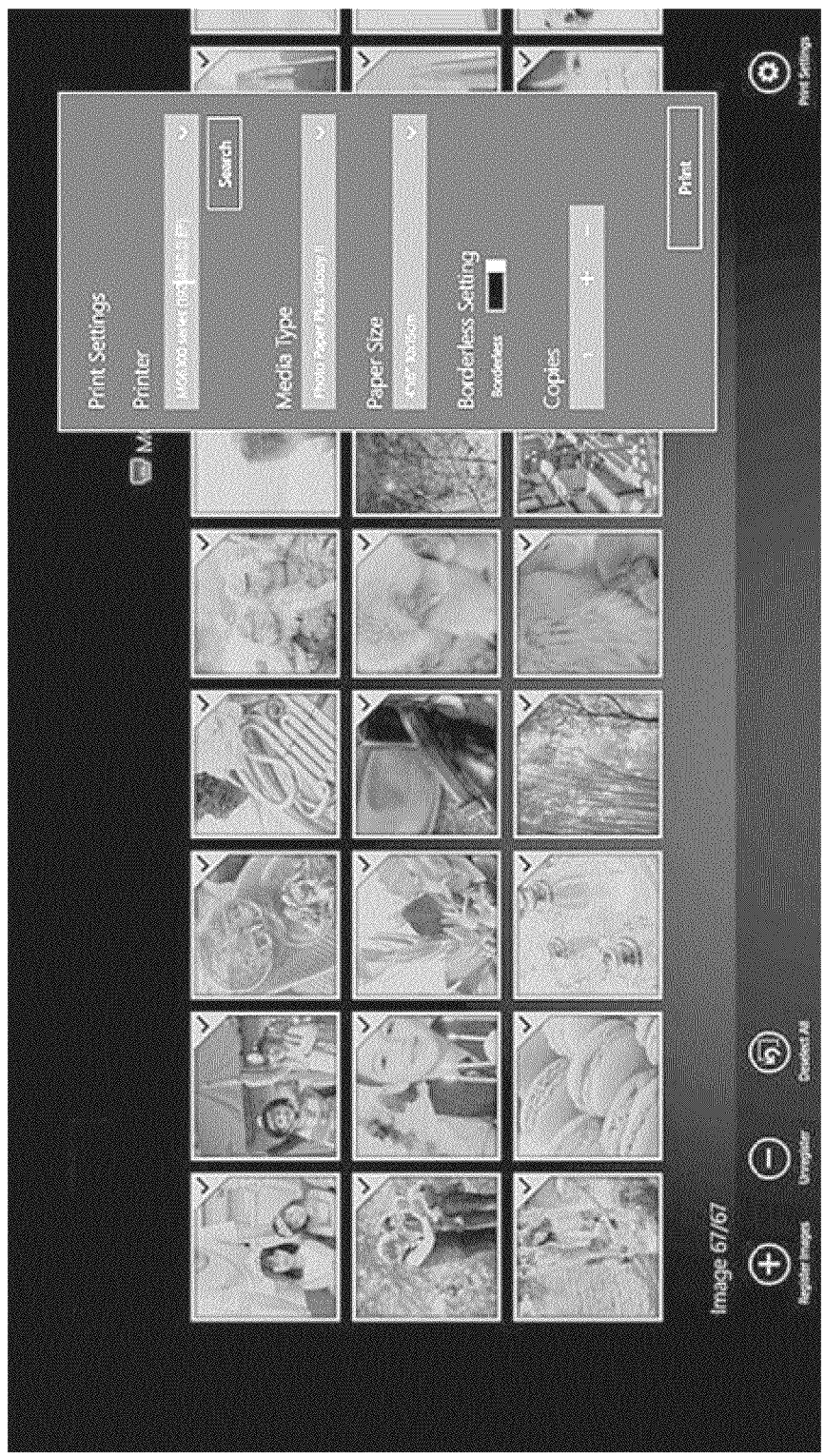
Figure 10:
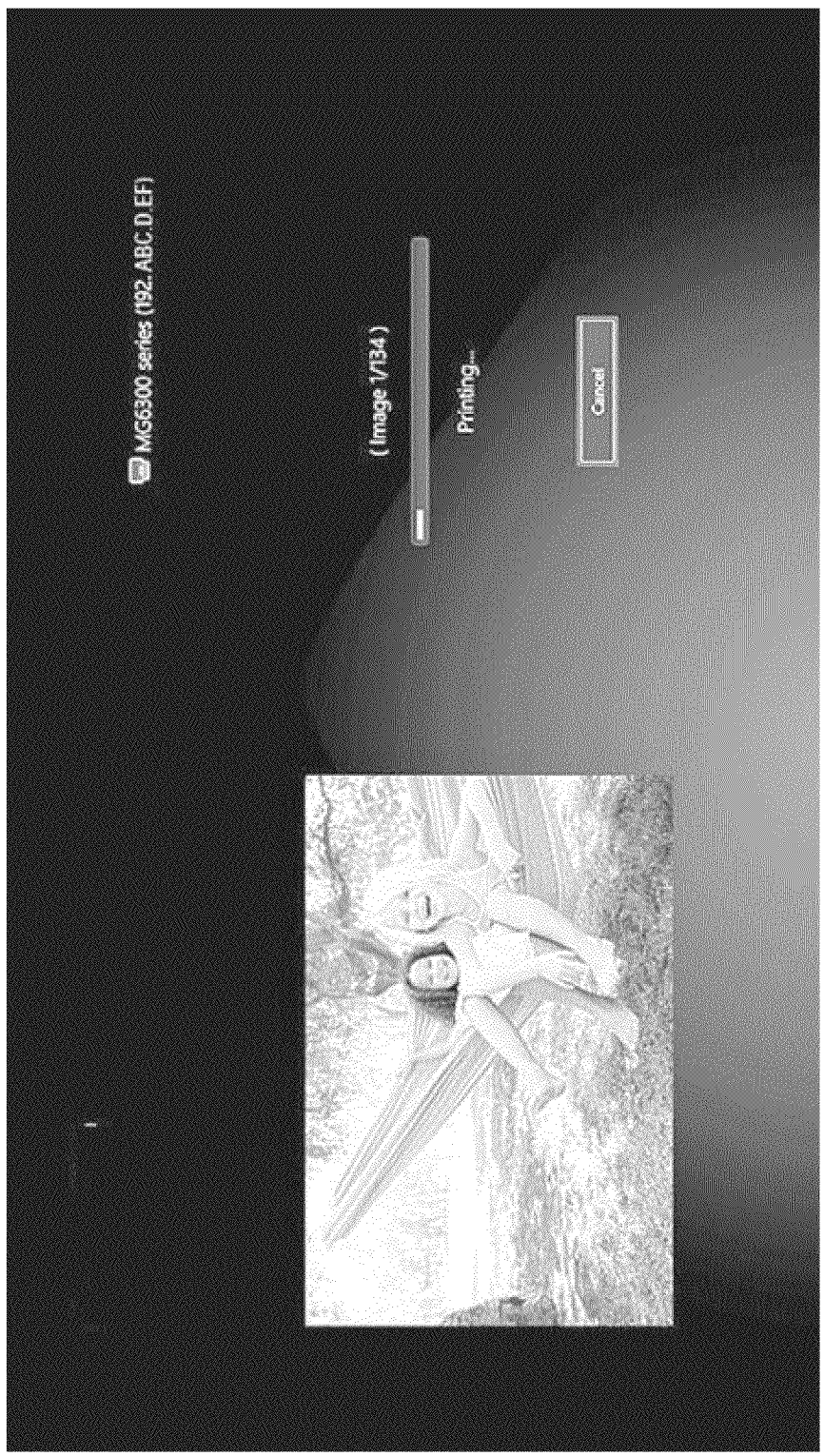

FIGS. 7-11 show an example of printing stored images using an example application as described herein. FIG. 7 shows a graphical user interface display, on which thumbnails of stored image files are arranged in the middle of the display, and along the bottom. From the thumbnails, a number of images have been selected, as indicated by the checkmark in the upper right corner of each selected thumbnail. As seen in FIG. 8, the default printer, in this example named "MG6300 series" and located at IP address 192.ABC.D.EF, may be used to print the selected images. However, as seen in the print settings interface shown in FIG. 9, an alternate printer or other device may be selected for use, as well as various other printing settings such as media type, paper size, borderless setting, number of copies, etc. chosen. By selecting "search", an alternative printer or other device may be searched for, and selected. In some embodiments, inputting the printing settings may narrow the number of returned printers or devices, as only the printers or devices that correspond to the inputted settings are returned in the search results. In other embodiments, the printing settings available to the searched (devices) results may display, and selecting printing settings may further narrow the printers or devices from those originally discovered in the search. Once the selection is finalized, printing may proceed, as shown in FIG. 10.

Figure 11:
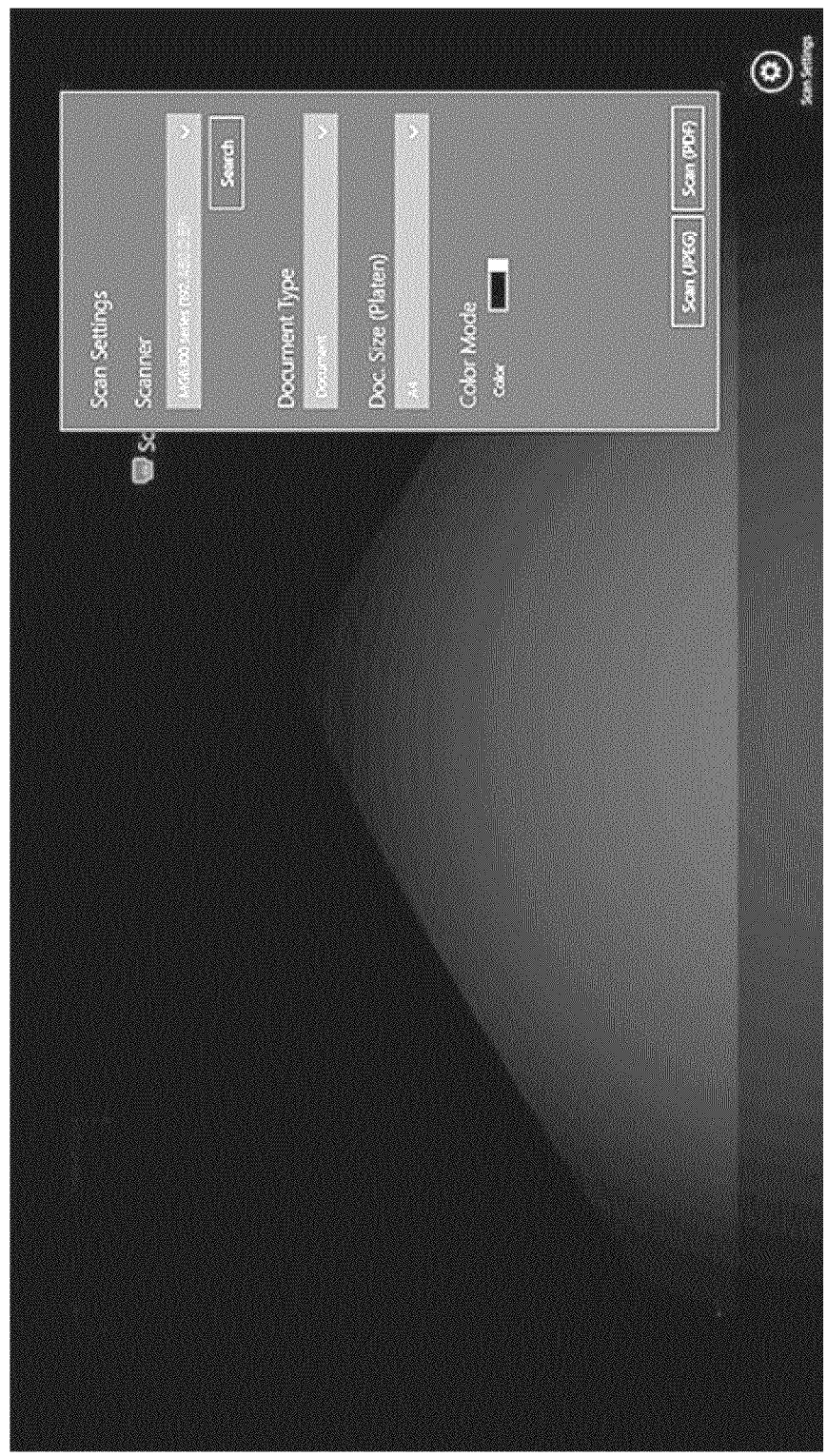

Similarly, a scanner other than the default scanner may be searched for, and selected, for use in scanning operations, as shown in FIG. 11. Again, settings such as document type, document size (whether platen or feeder), color mode, scan output file type, etc. may be set, and/or affect the searched for devices, resulting listings, and of course the ultimately chosen device. In other alternative example embodiments, the search results may be impacted or dictated by the capabilities of the currently selected device, for example, so that only available options are displayed.

In the scenario discussed above, the remote devices may have already been installed to the tablet by the system administrator. However they are not visible to the print/scan application since it bypasses the normal print path and doesn't see the installed devices. The subject matter disclosed herein augments a perhaps more conventional discovery process by also enumerating installed devices. Therefore, if the remote print/scan device has already been installed to the local system, then the application would obtain the necessary communication information from the internal Windows device tree and augment the network-discovered device list with this information.

Figure 12:
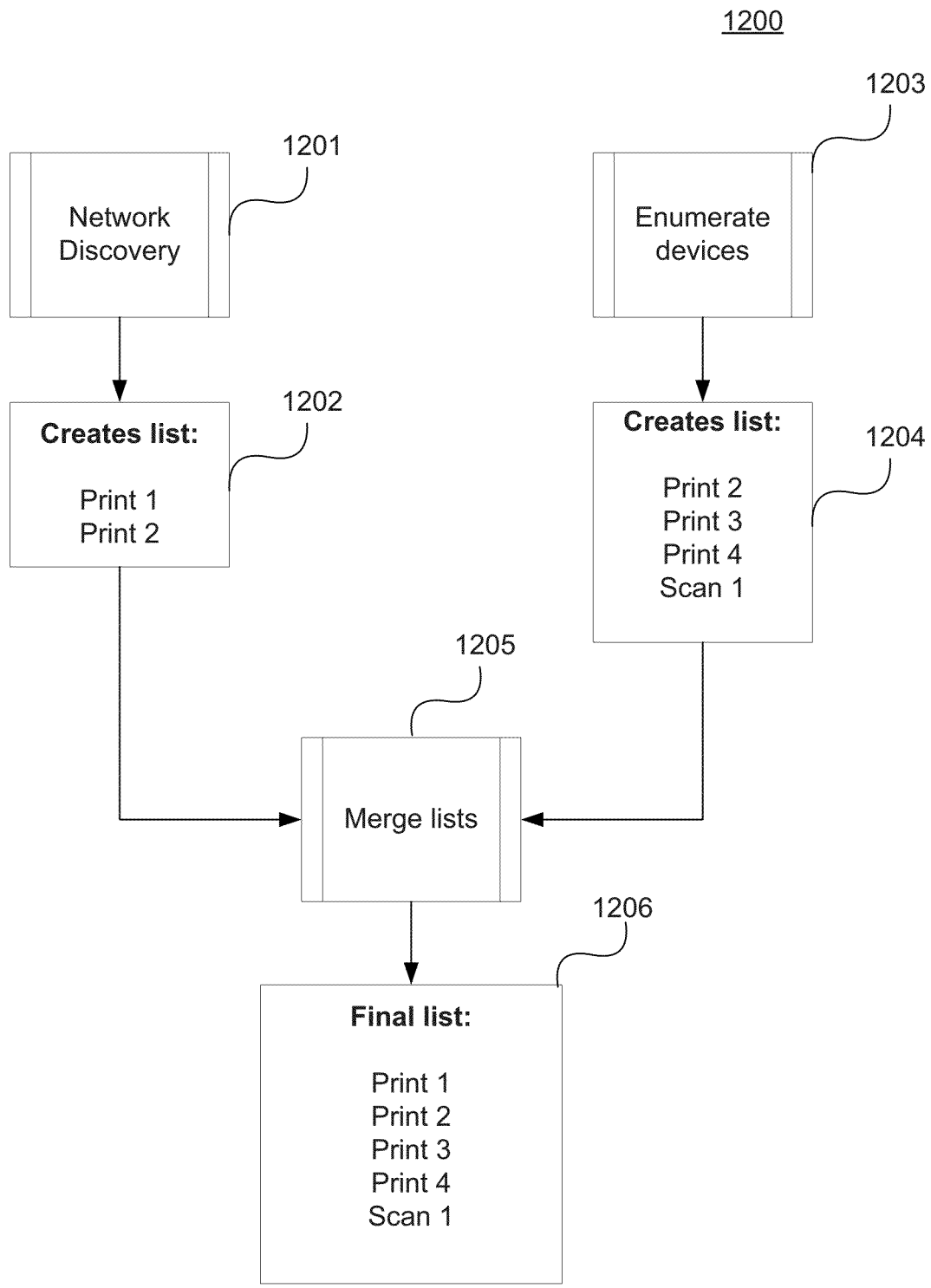
FIG. 12 shows an example process flow of discovery of scan and print devices.

The complete discovery process could then function as, for example, shown in FIG. 12.

This scenario 1200 corresponds to device discovery with respect to a tablet system, not specifically shown. In this case devices "Print 2", "Print 3", "Print 4", and "Scan 1" have already been added to the tablet system. The device "Print 1" has not, but it is locally discoverable. Network discovery 1201 will find all suitable devices in the local subnet and create a list 1202, on which "Print 1" and "Print 2" are listed as available devices. Device enumeration 1203 will find all print/scan devices already installed to the system and list its believed available devices as seen on 1204 as "Print 2", "Print 3", "Print 4", and "Scan 1". Then a merge process 1205 will eliminate duplicates by way of a unique device identifier to yield a final list 1206, on which "Print 1", "Print 2", "Print 3", "Print 4", and "Scan 1" are all listed without repetition or omission. In such a scenario a unique identifier exists that is available both through network discovery and through device enumeration that allows filtering out the duplicates. In one embodiment, network discovery is implemented as described above using network broadcast and device enumeration can be accomplished using the standard Windows API PnpObject.FindAllAsync.

Figure 13:
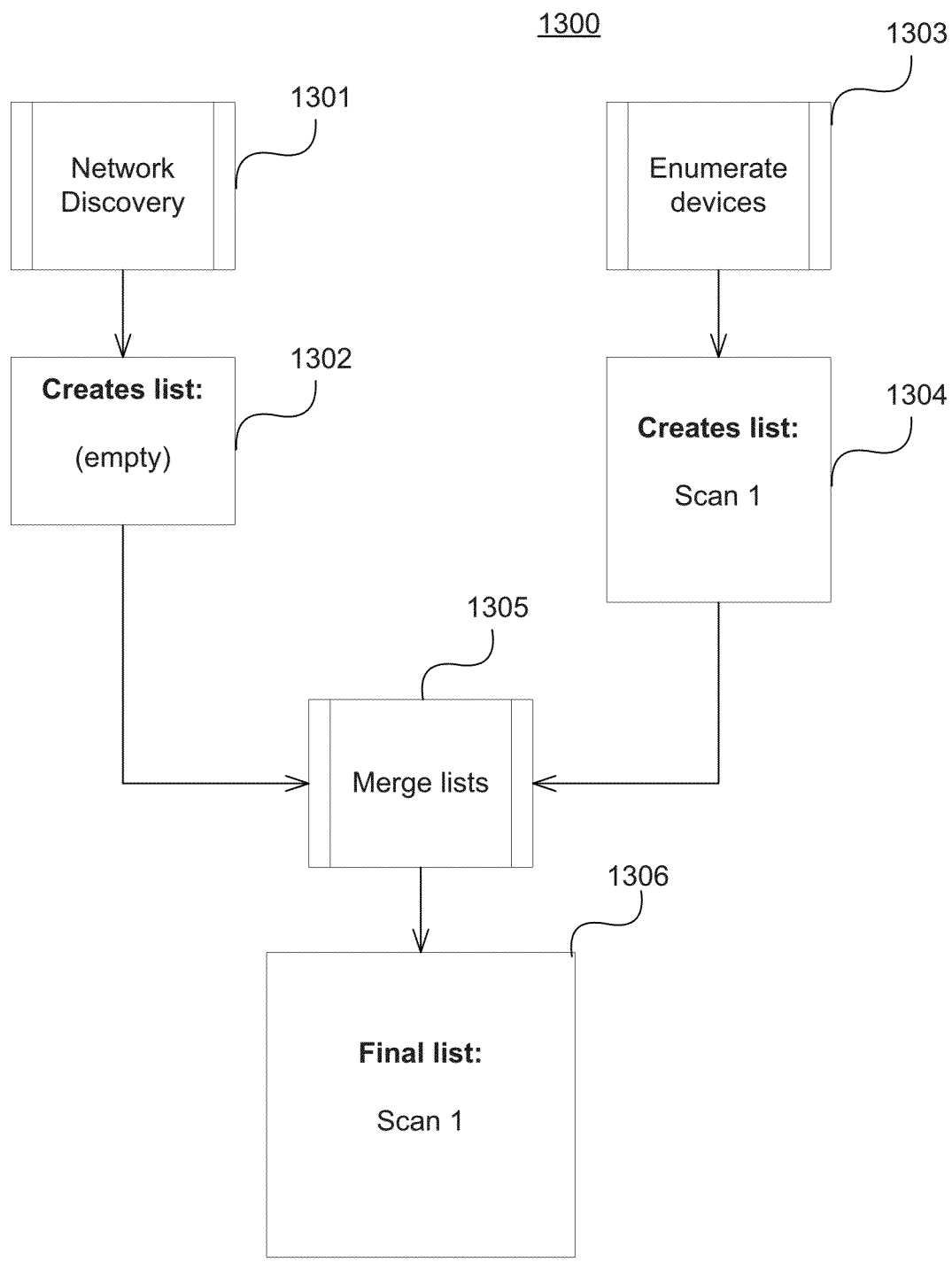
FIG. 13 shows an example process flow of discovery limited to scan devices only.

Likewise, in the case where the app only has scan functionality it would limit the search to scan devices only and could work as shown in FIG. 13. As discussed with respect to FIG. 12, devices "Print 2", "Print 3", "Print 4", and "Scan 1" have already been added to the tablet system. The device "Print 1" has not, but it is locally discoverable. However, since only scan functionality has been requested or the app has been set to "scan" only, when network discovery 1301 finds all suitable devices in the local subnet and creates a list, no devices are returned and the resulting list is 1302 is empty. Device enumeration with a scan limitation 1303 will find all scan devices already installed to the system and list its believed available devices as seen on 1304 as "Scan 1". Then a merge process 1305 will eliminate duplicates by way of a unique device identifier to yield a final list 1306, on which "Scan 1" are all listed without repetition or omission.

Figure 14:
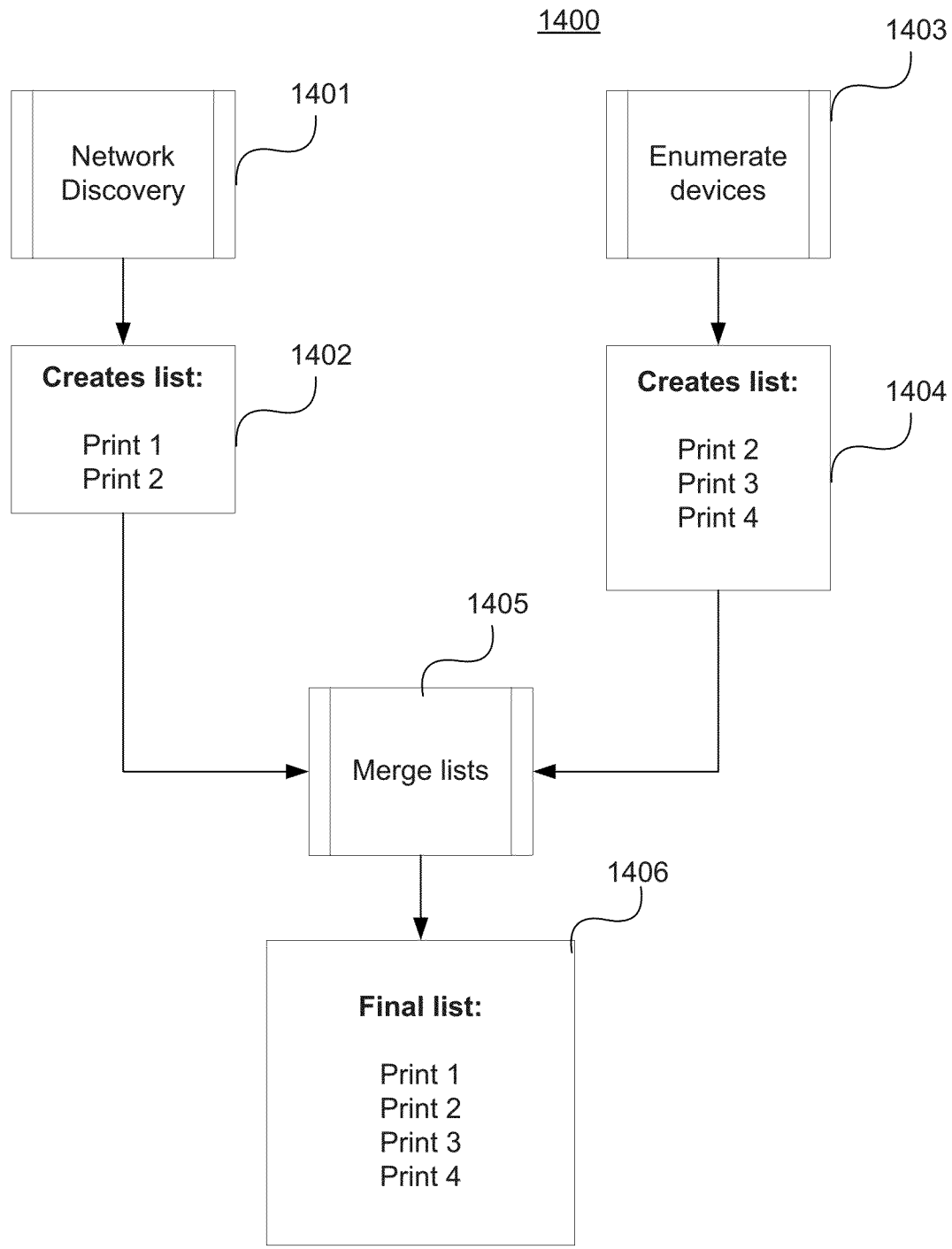
FIG. 14 shows an example process flow of discovery limited to print devices only.

And finally, if the app only supports printing then it would correspondingly limit the discovery to print devices only, as shown in FIG. 14. Again, devices "Print 2", "Print 3", "Print 4", and "Scan 1" have already been added to the tablet system. The device "Print 1" has not, but it is locally discoverable. Network discovery 1401 will find all suitable devices that are print devices, in the local subnet and create a list 1402, on which "Print 1" and "Print 2" are listed as available devices. Device enumeration 1403 will find all print/scan devices already installed to the system and list its believed available devices as seen on 1404 as "Print 2", "Print 3", and "Print 4". Then a merge process 1205 will eliminate duplicates by way of a unique device identifier to yield a final list 1206, on which "Print 1", "Print 2", "Print 3", and "Print 4" are all listed without repetition or omission.

With current implementations, remote devices are unreachable. Some implementations enable manual discovery by allowing users to enter the IP address of the remote device. However, it is unlikely that the user would have that information. With the application of the subject matter herein, once the device has been installed to the system the app can automatically look up the IP address from system information and use that information transparently, as if the device were installed locally. From the user's perspective there is no difference—discovery happens automatically and the remote device appears in the user's list of available print/scanners.

Thus, the subject matter described herein includes a means to discover available network-connected print/scan devices from a printing/scanning application.

The subject matter described herein also includes a means to augment the standard broadcast/reply discovery mechanism with a means to include previously installed devices in the discovery results.

The subject matter described herein also includes a means to filter out duplicate devices in cases where the device is both installed to the system and also locally available.

Such means, methods and systems may be applied to a variety of configurations, of networked devices, and of devices having varying protocols for connection.

A comparison of discovery methods for WSD & non-WSD devices is considered.

Figure 15:
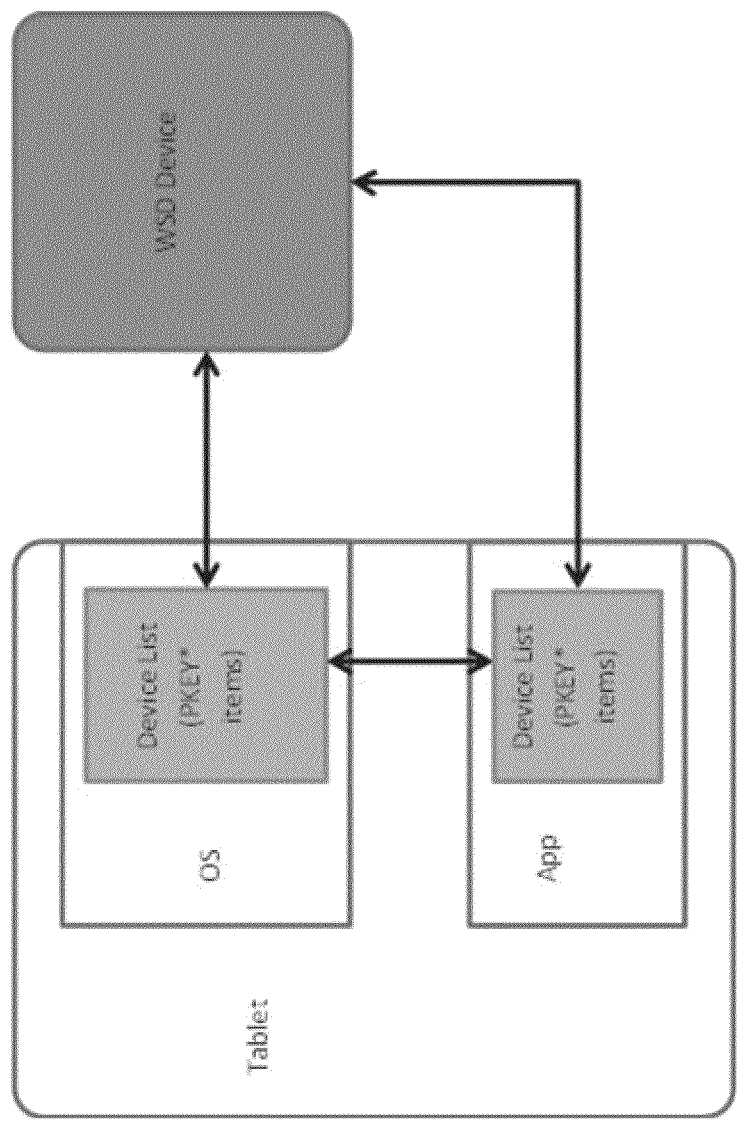
FIGS. 15 and 16 compare discovery methods for WSD & non-WSD devices.

FIG. 15 corresponds to a scenario in which the operating system (OS) embodied on a tablet has built a table of devices that is populated with property key (PKEY) items for a specific device by issuing a series of WSD queries to the device. The app makes a similar series of WSD queries to the device and builds its own list. Since the two lists originate from the same source they both have access to the same items and the items are known to be identical if they originated from the same device. Therefore if the PKEY serial number item matches then the lists are referring to the same device. This is one example of a method that could be used in conjunction with the other methods discussed herein to determine identification and uniqueness of a discovered device. In the above-discussed example PKEY is used, however another definition that tells the property system everything it needs to know about the property, description, string, value, name, name-value pair or other property identifying information can be used where appropriate in other example methods and embodiments.

Figure 16:
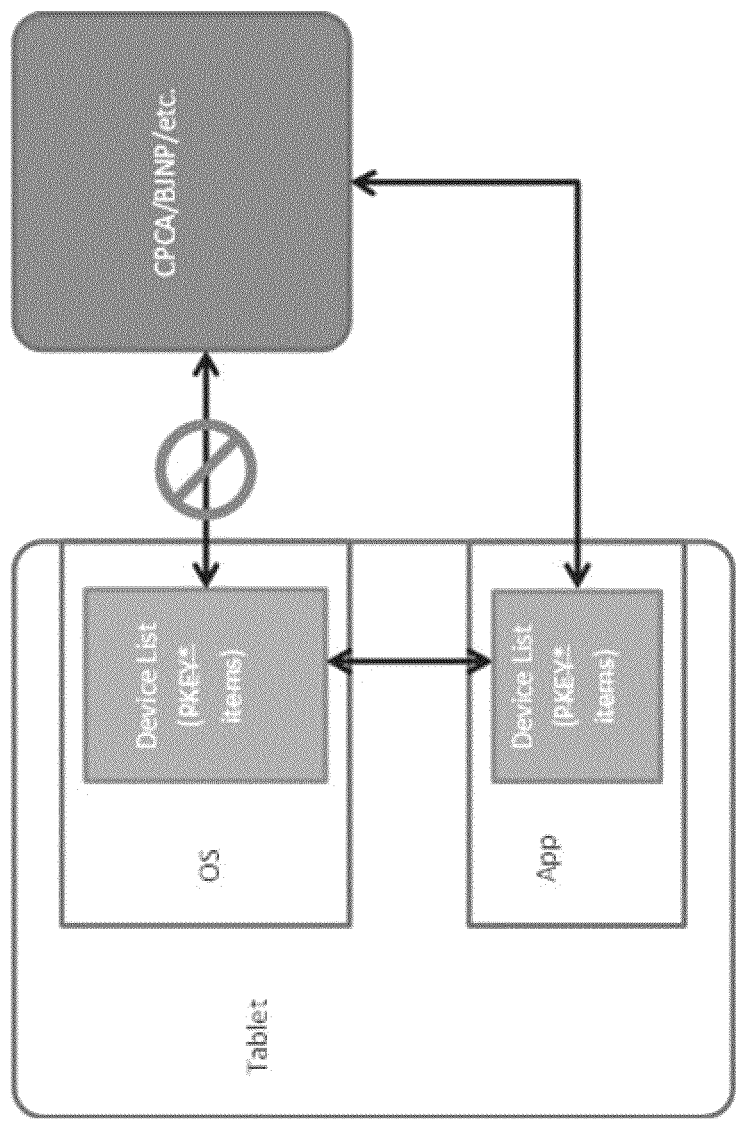

In the case of a non-standard interface (such as a non-WSD interface, such as BJNP, CPCA, or other proprietary-type protocols/interfaces etc.), as shown in FIG. 16, the OS doesn't know how to query the device for any standard items such as serial number, IP address, etc. The app can know the details of BJNP, CPCA, other proprietary protocols, etc. and could query for certain items but it doesn't do any good since there is no guarantee that the corresponding items will be in the device list built by the OS. The one exception is the IP address. However since that can change during the time between when the OS list is built and when the app executes, it is not reliable. In some embodiments and applications, it is possible to use Address Resolution Protocol (ARP) or another protocol or conversion process to obtain the MAC address (which is fixed and does not change) from the IP address. This is another example of a method that could be used in conjunction with the other methods discussed herein to determine identification and uniqueness of a discovered device.

An example merge process and eliminating duplicates using serial number as a key is described below, with reference to Tables 3-6.

In one scenario, after doing a network discovery a list is obtained of all the discovered devices, "Device 1", "Device 2", "Device 3", and "Device 4" as shown in Table 3. Alternatively, enumerated discovery could be performed first. The order of the discovery operations does not make a significant difference. Along with the discovered devices, identifying information, in Table 3 serial number, is retrieved to identify and enable further meaningful use of the discovered devices.

TABLE 3

Discovered devices from network discovery

| Device | Serial Number |
|---|---|
| Device 1 | ab12345 |
| Device 2 | ab45678 |
| Device 3 | ab91234 |
| Device 4 | ab56789 |

Then, enumerated discovery is begun, and for example, "Device 5" is found first, and entered on an enumerated discovery list, as shown in Table 4.

TABLE 4

Discovering devices from enumerated discovery

| Device | Serial Number |
|---|---|
| Device 5 | cd12345 |

The serial number may be checked against the Table 3 list. Since the serial number "cd12345" of "Device 5" does not duplicate any of the already known serial numbers of Table 3, it is determined that this device, "Device 5" is a new, unique device. Thus, this newly discovered (through enumeration) device "Device 5" is added to the list of network discovery discovered devices originally shown in Table 3. Now a listing of discovered devices looks like that shown in Table 5.

TABLE 5

Discovered devices from network discovery, and adding in from enumerated discovery

| Device | Serial Number |
|---|---|
| Device 1 | ab12345 |
| Device 2 | ab45678 |
| Device 3 | ab91234 |
| Device 4 | ab56789 |
| Device 5 | cd12345 |

Continuing with the enumerated discovery, "Device 6" is found, and its information shown in Table 6.

TABLE 6

Continuing discovering devices from enumerated discovery

| Device | Serial Number |
|---|---|
| Device 6 | ab12345 |

The serial number "ab12345" of "Device 6" is checked against the list of network discovery discovered devices from Table 3, but since the serial number matches that of "Device 1" already present, it is assumed that the devices are the same and that this newly-discovered "Device 6" may be ignored. Such processes can be repeated until the enumerated discovery completes (that is until no further devices are discovered).

If, for example, "Device 6" were the last enumerable device, then the final list of discovered devices resulting from the device discovery and enumerated discovery would be the same as that shown in Table 5. If, however, another device were discovered with a serial number not already appearing in Table 3, then that device and its serial number (or other identifying information) would be appended to Table 5.

In some embodiments, the newly discovered devices may be appended to the bottom of the list of previously discovered devices. In other embodiments, the newly discovered devices may be inserted at the top of the list of previously discovered devices. In some embodiments, the order of the devices may be largely chronological (in order of discovery). In other embodiments, the order may change during discovery, or after completion of discovery, and be based on the name of the device, the type of the device, or other identifying information of the device, in alphabetical or numerical order.

The immediately preceding example discusses "real-time" checking of newly discovered devices against the existing list. However, in other embodiments and examples, an entire list may be accumulated for each of network discovery, enumerated discovery, or other discovery protocol(s), and then further operation delayed, such as the separate lists compared and merged after the separate and complete discovery lists are made. Whether real-time or delayed merging and device discovery is formed depends on the individual system and devices, and may be influenced by constraints such as time, type of device desired to be discovered, OS, available memory, user settings, etc.

Figure 17:
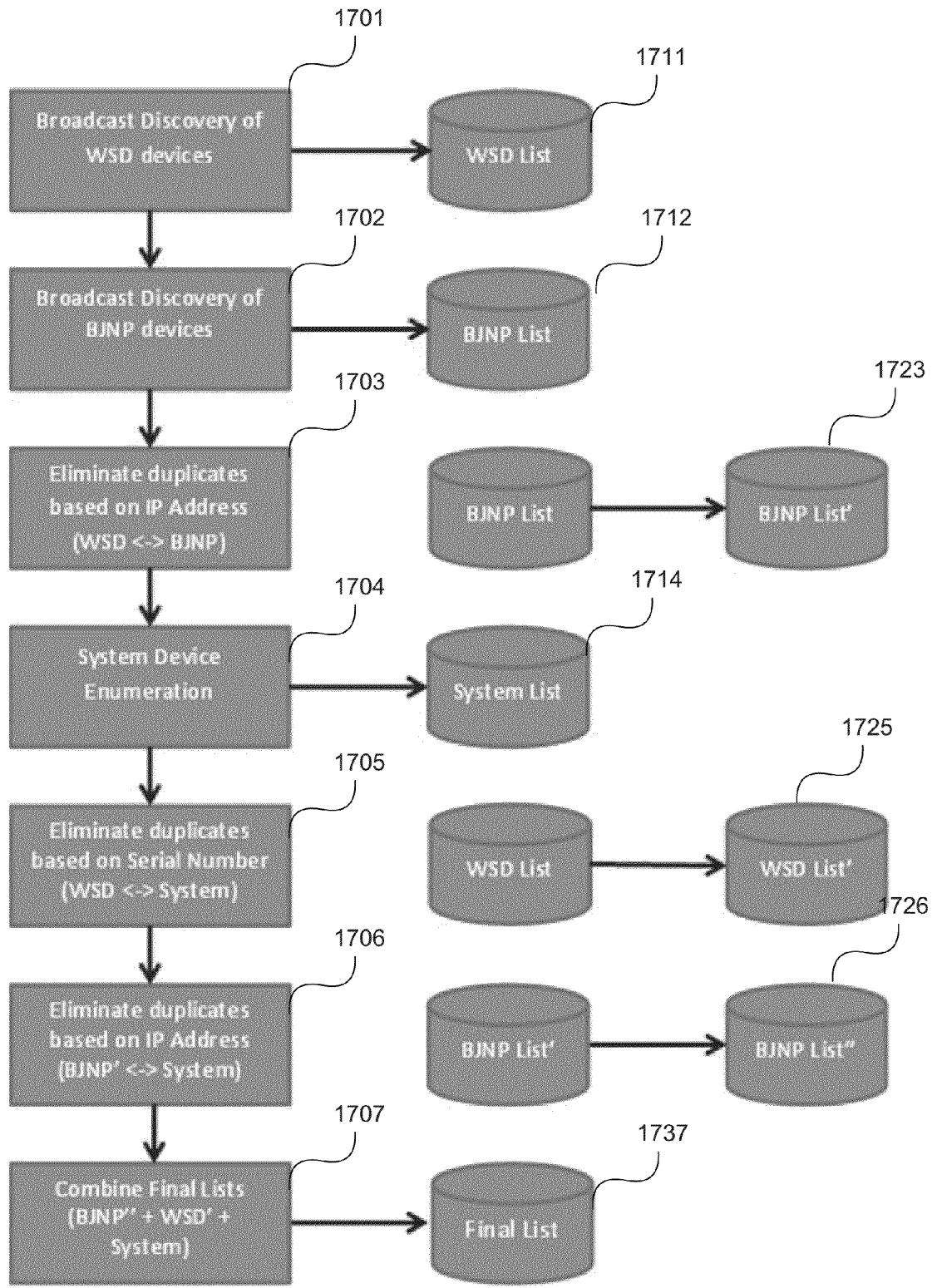
FIG. 17 is a first example of expanded enhanced discovery, using multiple connectivity protocols.

Device discovery using three different methods is discussed, referencing FIG. 17, in an example where system device enumeration compliments discovery of WSD devices and BJNP devices. Although the specific proprietary protocol BJNP is discussed, other proprietary or non-proprietary protocols may be substituted with similar satisfactory outcomes.

Such a method may be performed by first, broadcast discovery of WSD devices 1701, with the discovered WSD devices itemized on a list "WSD" 1711. Subsequently, broadcast discovery of BJNP devices 1702 may be performed, and the discovered BJNP devices itemized on a list "BJNP" 1712. IP addresses may be determined from service addresses of the discovered devices, and the lists updated. Accordingly, duplicate device listings can be eliminated using the IP address as a merge key, so that a "BJNP' list" 1723 is created by removing from the "BJNP list" 1712 the devices that are also listed on the "WSD list" 1711, as in Equation 1.

$$BJNP - (BJNP \cap WSD)_{IP\ address} = BJNP' \qquad \text{Equation 1}$$

System device enumeration 1704 may also be performed, resulting in an itemization of enumerated devices on a list "System" 1714. Duplicates may be eliminated using, for example, serial number as a merge key, so that a "WSD' list" 1725 is created by removing from the "WSD list" 1711 the devices that are also itemized on the "System list" 1714, as in Equation 2.

$$WSD - (WSD \cap System)_{S/N} = WSD' \qquad \text{Equation 2}$$

Duplicates also itemized on the "System list" 1714 may also be eliminated from the "BJNP list" 1712, to create a new "BJNP''' list" 1726, as in Equation 3.

$$BJNP' - (BJNP' \cap System)_{IP\ address} = BJNP'' \qquad \text{Equation 3}$$

Thus, from the original "WSD list" 1711, "BJNP list" 1712, and "System list" 1714 obtained through broadcast discovery 1701, 1702 and system device enumeration 1704, exclusive non-overlapping lists of "BJNP" list 1726 and "WSD' list" 1725 are created. Combining these exclusive lists creates an all-inclusive final list 1737, as in Equation 4.

$$BJNP''+WSD'+System=All\text{-}inclusive \quad \quad \text{Equation 4}$$

It is possible that in some environments, printers that only support older connection protocols may not be discoverable. Additionally, devices that have been re-connected under different information may display in duplicate. However, in the majority of cases, the processes described herein will display a comprehensive list of available devices, for the user to access and utilize, with no additional work to the user.

Figure 18:
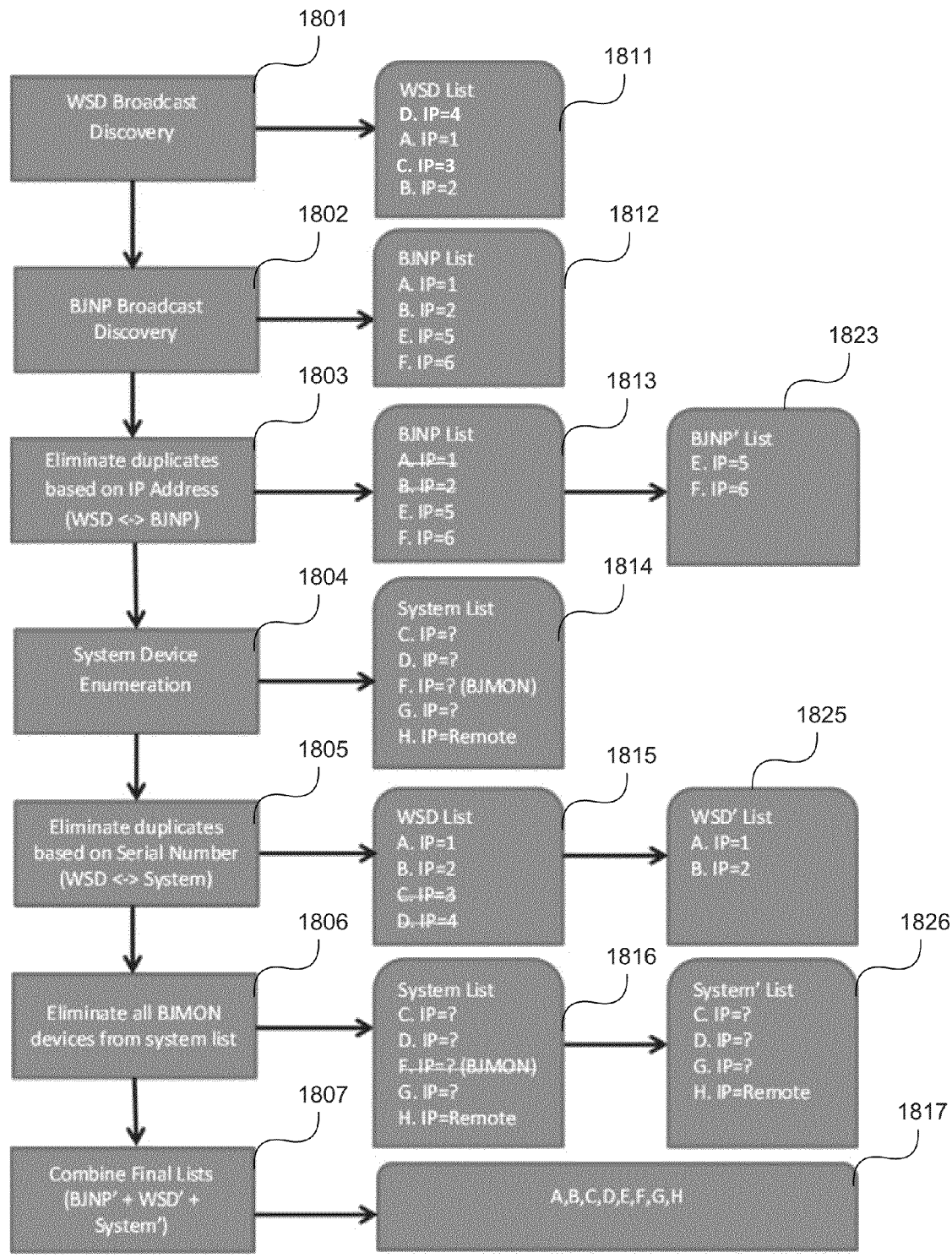
FIG. 18 shows a further example of expanded enhanced discovery, with respect to WSD, BJNP, and system device enumeration.

The example of device discovery using a plurality of different methods or protocols is further detailed in FIG. 18, with respect to WSD, BJNP, and system device enumeration. Although WSD, and BJNP are listed as discovery protocols or related printer protocols, and used with system device enumeration, the instant subject matter is not limited to these protocols, or to the order of discovery detailed below. Instead, the protocols and processes discussed herein are examples of possible processes for enhanced discovery, upon which other discovery processes utilizing these and other protocols or discovery methods may be based.

As shown in FIG. 18, WSD broadcast discovery 1801 is performed first. The client sends WSD User Datagram Protocol (UDP) broadcast message(s) & the listening devices send UDP response. Since the IP address utilized is live and not cached, the responses (listed in "WSD list" 1811) are known to be "fresh" and valid. Secondly, BJNP broadcast discovery 1802 is performed. The client sends BJNP UDP broadcast message(s) & listening devices send UDP response. Again, the IP addresses used are live, and not cached, so the responses (listed in "BJNP list" 1812) are known to be valid.

From these discovered (WSD and BJNP) devices (listed as 1811 and 1812), duplicates may be eliminated based on IP address 1803. If the IP address of a WSD device of 1811 matches the IP address of a BJNP device of 1812, it may be removed from the BJNP list, as seen in 1813. The resulting BJNP' list is shown in 1823.

Next, system device enumeration 1804 is performed, to enumerate devices (listed in "System list" 1814) that were previously installed to the system. For these enumerated devices, the corresponding IP address(es) are cached so there may be some uncertainty as to whether the IP address is still valid. There may be a desire to ping the device to confirm validity of the associated IP address. For example, device H is known to be a remote device, and there is no confirmation of whether its IP address is still valid.

From these discovered (WSD and System) devices (listed as 1811 and 1814), duplicates may be eliminated based on serial number 1805. Not all system devices will have a serial number, but if it does and it matches that of a discovered WSD device of 1811, then that system/WSD device can be eliminated from the WSD discovered device(s) list, as seen in 1815. If the serial number matches but the IP address does not, then the "duplicated" device should be removed from the System list 1814 instead of the WSD list 1811. The resulting list, with duplicates removed, is shown as WSD' list 1825.

Next, all BJMON devices may be removed 1806, as seen in 1816 and the resulting System' list in 1826. For example, E & F are legacy devices that only support BJNP; that is why they do not show up in the WSD discovery list. Therefore when F is installed it will use the proprietary BJMON monitor. Since that interface is unusable from a $3^{rd}$ party app it may be ignored for the purposes of this application. The modified lists may be combined to result in a final, all-inclusive list 1817 of discoverable and available devices for further user operation.

In large network environments it has been found that broadcast discovery will sporadically fail for the following reason. When the client sends a broadcast then all the WSD devices on the network will respond roughly at the same time. As the number of devices increases so does the probability that multiple response messages will collide. With TCP the message would be re-sent until a confirmation is received. However since UDP is connection-less, the message is lost so the client doesn't discover the device. Such intermittent UDP failures lead to another use case for the enhanced discovery method of the instant application.

The subject matter disclosed herein can also be used in embodiments related to USB device discovery. For example, the Windows 8.1 OS provides a high level Scan API so it is unnecessary to use low-level WSD or BJNP protocols to communicate directly with the scan device, that is, provided that the device is installed to the system. This also enables scanning from USB devices, something which had not been possible on prior Windows 8 platforms.

Figure 19:
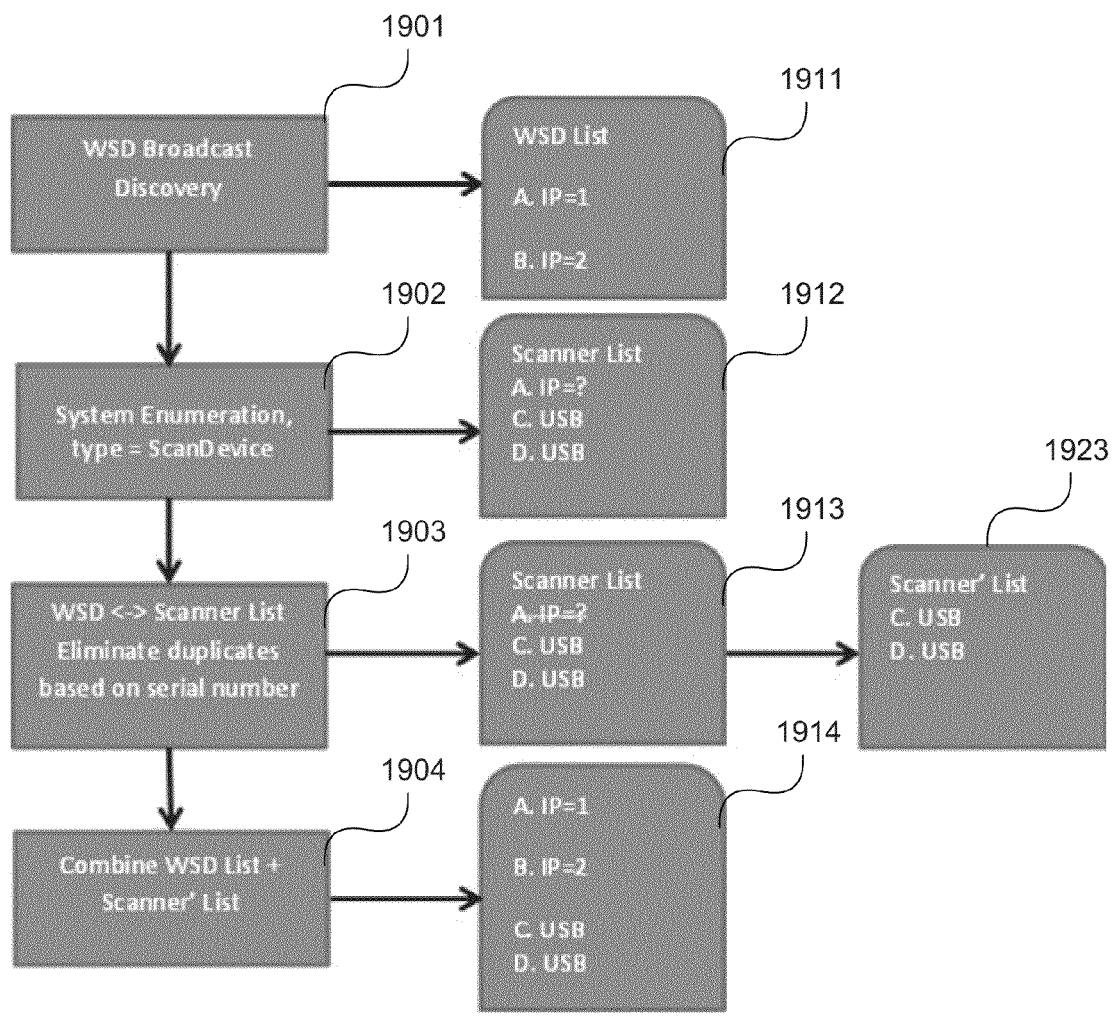
FIG. 19 shows an example application of enhanced discovery to discovering USB-connected devices along with WSD devices.

FIG. 19 shows how this enhanced discovery method could be applied to discovering USB-connected devices along with WSD devices.

In a first process, WSD Broadcast Discovery 1901 is performed. The client sends WSD UDP broadcast message & listening devices send UDP response. The answering IP addresses are live, and not cached, so the returned responses (listed in WSD list 1911) are known valid responses. As a second or subsequent step, USB discovery 1902 may be performed. USB discovery is a form of system enumeration that filters for type="ScanDevice". This will find all installed scanners whether they are USB or WSD. From the resulting lists 1911, 1912, serial number may be used to eliminate duplicates 1903. As shown in the duplicate elimination example 1913, since USB devices won't have a serial number, they will be retained in the list 1923. Combining 1904 the WSD list 1911 and the scanner' list (accounting for duplicates) 1923 results in a final inclusive list 1914.

In some embodiments, the connected device information may be periodically refreshed, flashed or updated. The associated device lists may then be updated, for example to reflect changes in identifying information of connected devices, such as IP address. In some embodiments, the discovered device lists may have timing information, to indicate the accuracy, or duration of validity of the information therein.

In other embodiments, the lists may not be categorized by method of discovery, but rather by potential key types. The key types could encompass various forms of discoverable meta data, such as IP address, serial number, MAC address, model, geographical or network location, etc.

Figure 3A:
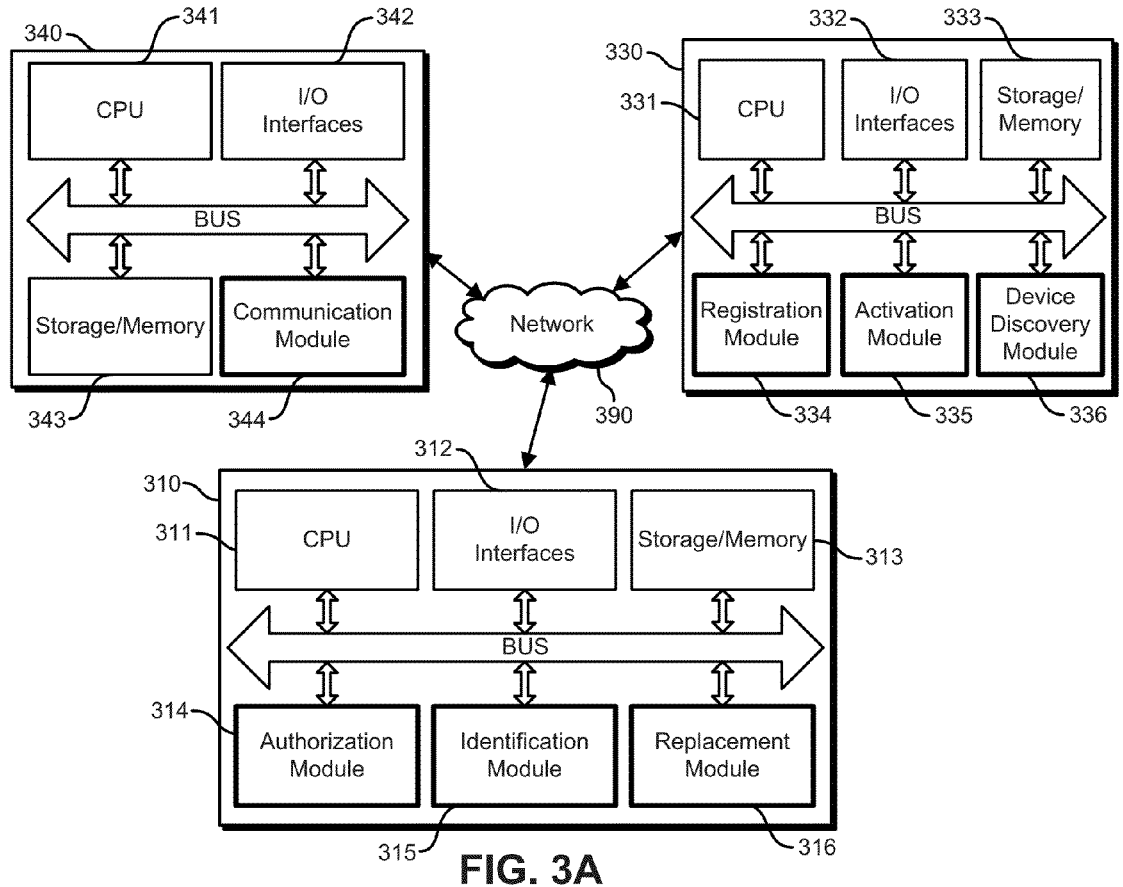
FIGS. 3A and 3B show additional examples of software for providing device discovery capability to a user via an application.
Figure 3B:
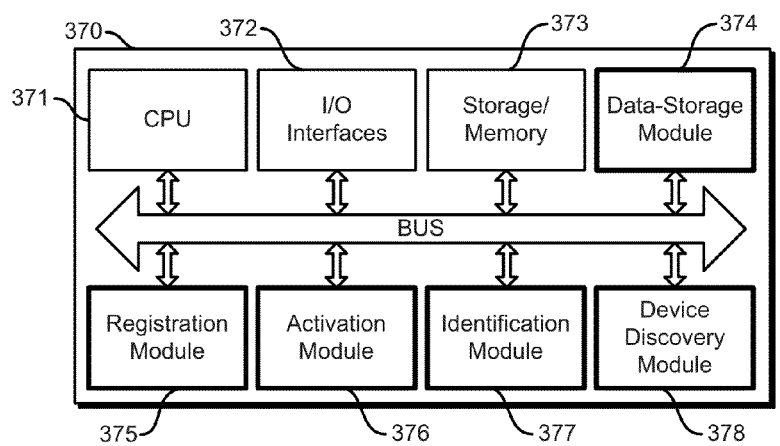

FIG. 3A and FIG. 3B illustrate example embodiments of software and hardware systems for device discovery. The system of FIG. 3A includes a user-associated device 340, a discovery device 330, and a candidate device 310, which communicate by means of one or more networks 390. The candidate device 310 includes one or more processors (CPU) 311, one or more I/O interfaces 312, and storage/memory 313. The CPU 311 includes one or more central processing units, which include microprocessors (e.g., a single core microprocessor, a multi-core microprocessor) or other circuits, and the CPU 311 is configured to read and perform computer-executable instructions, such as instructions in storage or in memory (e.g., in modules that are stored in storage or memory). The computer-executable instructions may include those for the performance of at least some of the operations described herein. The one or more I/O interfaces 312 include communication interfaces to input and output devices, which may include a keyboard, a display, a mouse, a printing device, a touch screen, a light pen, an optical-storage device, a scanner, a microphone, a camera, a drive, a card reader, and a network (either wired or wireless).

The storage/memory 313 includes one or more computer-readable or computer-writable media, for example a computer-readable storage medium. A computer-readable storage medium, in contrast to a mere transitory, propagating signal, includes a tangible article of manufacture, for example a magnetic disk (e.g., a floppy disk, a hard disk), an optical disc (e.g., a CD, a DVD, a Blu-ray), a magneto-optical disk, magnetic tape, and semiconductor memory (e.g., a non-volatile memory card, flash memory, a solid-state drive, SRAM, DRAM, EPROM, EEPROM). The storage/memory 313 is configured to store computer-readable data or computer-executable instructions. The components of the candidate device 310 communicate via a bus.

The candidate device 310 also includes an identification module 315, an authorization module 314, and a replacement module 316. In some embodiments, the devices in the system include additional or fewer modules, the modules are combined into fewer modules, or the modules are divided into more modules. Modules include logic, computer-readable data, or computer-executable instructions, and may be implemented in software (e.g., Assembly, C, C++, C#, Java, BASIC, Perl, Visual Basic), hardware (e.g., customized circuitry), and a combination of software and hardware. Though the computing device or computing devices that execute a module perform the operations, for purposes of description a module may be described as performing one or more operations.

The authorization module 314 includes computer-readable instructions that, when executed by one or more computing devices, cause the one or more computing devices (e.g., the candidate device 310) to send user credentials to an identity provider, to receive one or more tokens from the identity provider, and to send a registration request to the provisioning device 330. The activation module 315 includes computer-readable instructions that, when executed by one or more computing devices, cause the one or more computing devices to obtain a code (e.g., an activation code, a retrieval code), for example by means of a user interface, a network (e.g., WiFi network, an NFC network, a Bluetooth network), and another input device (e.g., card reader, a biometric detector, a camera). The replacement module 316 includes computer-readable instructions that, when executed by one or more computing devices, cause the one or more computing devices to send one or more of the following to the provisioning device 330: a provisioning request, a device identifier, a token, an activation request, and a code (e.g., an activation code, a retrieval code). The replacement module 316 also includes computer-readable instructions that, when executed by one or more computing devices, cause the one or more computing devices to receive one or more API keys, an API secret, or both from the provisioning device 330.

The provisioning device 330 includes one or more processors (CPU) 331, one or more I/O interfaces 332, storage/memory 333, a registration module 334, an activation module 335, and a device discovery module 336. The registration module 334 includes computer-readable instructions that, when executed by one or more computing devices, cause the one or more computing devices (e.g., the provisioning device 330) to register a candidate device (which may include receiving a request, a device identifier, and a token), to generate an activation code, and send the activation code to a user-associated device. The activation module 335 includes computer-readable instructions that, when executed by one or more computing devices, cause the one or more computing devices to activate a candidate device, which may include receiving and validating an activation code and sending one or more API keys and an API secret to the candidate device. Also, the device discovery module 336 includes computer-readable instructions that, when executed by one or more computing devices, cause the one or more computing devices to store and associate the following for one or more candidate devices: device information, protocol information, tokens, activation codes, API keys, and API secrets.

The user-associated device 340 includes one or more processors (CPU) 341, one or more I/O interfaces 342, storage/memory 343, and a communication module 344. The communication module includes computer-readable instructions that, when executed by one or more computing devices, cause the one or more computing devices (e.g., the user-associated device) to obtain an activation code from the provisioning device 330. Additionally, the instructions cause the one or more computing devices to perform one or more of the following: display the activation code for a user, send the activation code to the candidate device 310 (e.g., by means of wireless communication), and transfer the activation code to another tangible medium (e.g., a printout, a USB drive, a smart card).

The system of FIG. 3B includes a discovery device 370. The discovery device 370 includes one or more processors (CPU) 371, one or more I/O interfaces 372, storage/memory 373, a data-storage module 374, a registration module 375, an activation module 376, an identification module 377, and a device discovery module 378. The identification module 377 includes computer-readable instructions that, when executed by one or more computing devices, cause the one or more computing devices to transmit identifying information and respond to receipts of identifying information (e.g., by sending device type, by sending device identifying information). The device discovery module 378 includes computer-readable instructions that, when executed by one or more computing devices, cause the one or more computing devices to obtain and store device types, obtain and store device identifying information, or both.

The above described devices, systems, and methods can be achieved by supplying one or more storage media having stored thereon computer-executable instructions for realizing the above described operations to one or more computing devices that are configured to read the computer-executable instructions stored in the one or more storage media and execute them. In this case, the systems and/or devices perform the operations of the above-described embodiments when executing the computer-executable instructions read from the one or more storage media. Also, an operating system (OS) on the one or more systems and/or devices may implement the operations of the above described embodiments. Thus, the computer-executable instructions and/or the one or more storage media storing the computer-executable instructions therein constitute an embodiment.

Any applicable computer-readable storage medium (e.g., a magnetic disk (including a floppy disk, a hard disk), an optical disc (including a CD, a DVD, a Blu-ray Disc™), a magneto-optical disk, a magnetic tape, and a solid state memory (including flash memory, DRAM, SRAM, a solid state drive)) can be employed as a storage medium for the computer-executable instructions. The computer-executable instructions may be written to a computer-readable storage medium provided on a function-extension board inserted into the device or on a function-extension unit connected to the device, and a CPU provided on the function-extension board or unit may implement the operations of the above-described embodiments.

This disclosure has provided a detailed description with respect to particular explanatory embodiments. It is understood that the scope of the appended claims is not limited to the above-described embodiments and that various changes and modifications may be made without departing from the scope of the claims.

What is claimed is:

1. A method for device discovery, the method comprising:
discovering a first set of devices;
creating a first list that includes the discovered first set of devices;
discovering a second set of devices;
creating a second list that includes the discovered second set of devices;
enumerating a third set of devices;
creating a third list that includes the enumerated third set of devices;
determining identifier keys for the first list, the second list, and the third list;
generating a modified second list by removing duplicates between the first list and the second list from the second list based on the determined identifier keys;
generating a modified first list by removing duplicates between the first list and the third list from the first list based on the determined identifier keys;
generating a twice-modified second list by removing duplicates between the modified second list and the third list from the modified second list based on the determined identifier keys; and
generating a fourth list by combining the modified first list, the twice-modified second list, and the third list.

2. The method of claim 1, wherein the first set of devices is discovered over connected networks using a first discovery protocol.

3. The method of claim 2, wherein the first discovery protocol is Web Services for Devices (WSD).

4. The method of claim 1, wherein the second set of devices is discovered over connected networks using a second discovery protocol.

5. The method of claim 4, wherein the second discovery protocol is a propriety discovery protocol.

6. The method of claim 5, wherein the third set of devices is already installed on a system.

7. The method of claim 1, wherein the identifier keys include at least one of IP addresses and serial numbers.

8. A system for device discovery, the system comprising:
at least one computer-readable medium; and
at least one processor that is in communication with the at least one computer-readable medium and that is configured to cause the system to
discover a first set of devices, a second set of devices, and a third set of devices, wherein the first set of devices is discovered over connected networks using a first discovery protocol, the second set of devices is discovered over connected networks using a second discovery protocol, and the third set of devices is devices previously installed on the system;
create a first list that includes the discovered first set of devices, a second list that includes the discovered second set of devices, and a third list that includes the discovered third set of devices;
determine identifier keys for the first list, the second list, and the third list;
generate a modified second list by removing duplicates between the first list and the second list from the second list based on the determined identifier keys;
generate a modified first list by removing duplicates between the first list and the third list from the first list based on the determined identifier keys;
generate a twice-modified second list by removing duplicates between the modified second list and the third list from the modified second list based on the determined identifier keys; and
generate a fourth list by combining the modified first list, the twice-modified second list, and the third list.

9. The method of claim 8, wherein the first discovery protocol is Web Services for Devices (WSD).

10. The method of claim 8, wherein the second discovery protocol is a propriety discovery protocol.

11. The method of claim 8, wherein the identifier keys include at least one of IP addresses and serial numbers.

12. A computer-readable storage medium storing computer-executable instructions that, when execute by one or more computing devices, cause the one or more computing devices to perform operations for
discovering a first set of devices over connected networks using a first discovery protocol;
creating a first list that includes the discovered first set of devices;
discovering a second set of devices over the connected networks using a second discovery protocol;
creating a second list that includes the discovered second set of devices;
enumerating a third set of devices, wherein the third set of devices is already installed on a system;
creating a third list that includes the enumerated third set of devices;
determining identifier keys for the first list, the second list, and the third list;
generating a modified second list by removing duplicates between the first list and the second list from the second list based on the determined identifier keys;
generating a modified first list by removing duplicates between the first list and the third list from the first list based on the determined identifier keys;
generating a twice-modified second list by removing duplicates between the modified second list and the third list from the modified second list based on the determined identifier keys; and
generating a fourth list by combining the modified first list, the twice-modified second list, and the third list.

* * * * *